No. 765,111. PATENTED JULY 12, 1904.
H. TURNBACH.
GLAND FOR STUFFING BOXES.
APPLICATION FILED APR. 9, 1904.
NO MODEL.
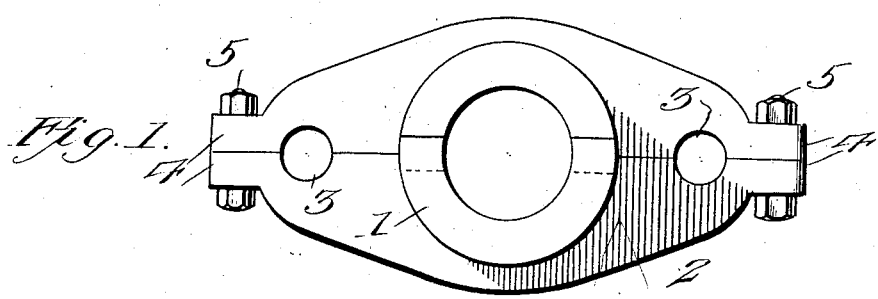
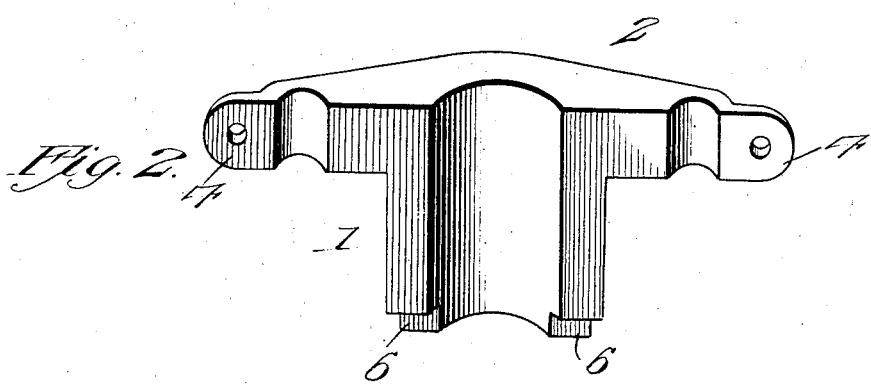
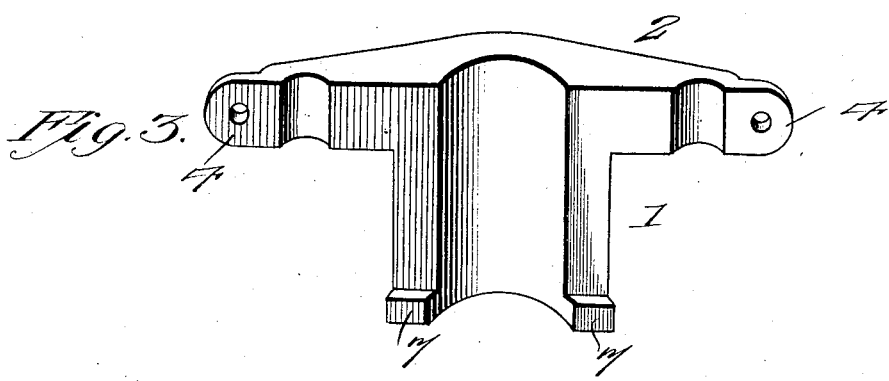
Witnesses
Inventor
Hurley Turnbach,
By Victor J. Evans
Attorney No. 765,111.

Patented July 12, 1904.

UNITED STATES PATENT OFFICE.

HURLEY TURNBACH, OF SHEPPTON, PENNSYLVANIA.

GLAND FOR STUFFING-BOXES.

SPECIFICATION forming part of Letters Patent No. 765,111, dated July 12, 1904.

Application filed April 9, 1904. Serial No. 202,466. (No model.)

*To all whom it may concern:*

Be it known that I, HURLEY TURNBACH, a citizen of the United States, residing at Sheppton, in the county of Schuylkill and State of Pennsylvania, have invented new and useful Improvements in Glands for Stuffing-Boxes, of which the following is a specification.

This invention relates to glands for stuffing-boxes, the object of the invention being to provide a simple, convenient, and economical construction of glands for use in connection with the stuffing-box of piston-rods and the like, the construction embodying means whereby the gland is adapted to be quickly and easily taken out and replaced whenever it is necessary to get at the packing, the construction of the gland also preventing the packing from wedging between the sections of the gland and spreading the same to such an extent as to impair the efficiency of the gland.

With the above and other objects in view the invention consists in the novel construction, combination, and arrangement of parts, as herein fully described, illustrated, and claimed.

In the accompanying drawings, Figure 1 is an inner face view of a gland embodying the present invention. Figs. 2 and 3 are detail perspective views of the gland-sections, showing the interfitting or overlapping parts thereof.

Like reference-numerals designate corresponding parts in all figures of the drawings.

The gland contemplated in this invention comprises a sleeve portion 1 and a flange portion 2, the gland as a whole being diametrically divided into two substantially equal and similar sections, which are individually shown in Figs. 2 and 3. The flange portions 2 are extended in diametrically opposite directions to provide for the reception therein of the usual gland bolts or rods, which pass through the openings 3 and connect with the cylinder-head or its equivalent, (not shown,) the flange portions 2 being also extended beyond the openings 3 to provide abutting lugs or ears 4, which are provided with openings for the reception of clamping or tie bolts 5, by means of which the sections of the gland are firmly secured together.

One of the sleeve-sections 1 is provided in its extreme edge with notches or recesses 6, while the other sleeve-section is provided with lugs or projections 7, which fit into the notches or recesses 6 and "break joint," so to speak, whereby the stuffing or packing is prevented from being forced between the meeting edges of the sleeve portions 1, which would result in forcing the sections of the gland apart and impairing its efficiency. By preference the interfitting lugs and notches are located at the extreme end of the sleeve 1, where said sleeve comes in contact with the usual packing contained in the stuffing-box.

From the foregoing description it will be seen that the gland as a whole may be quickly removed and replaced for renewal or repair or repacking purposes without dismantling the pump or engine in connection with which the gland is used, thus saving delay and annoyance.

The improved glands do not add materially to the cost of manufacture and by reason of their particular construction may be conveniently removed and replaced without requiring much room to work in. The break-joint feature prevents the forcing of the packing between the sections of the gland, while said sections are firmly held together and prevented from separating or spreading by means of the clamping or tie bolts referred to.

Having thus described the invention, what is claimed as new is—

A gland comprising two substantially equal sections, each having a sleeve portion with a flange at one end, the terminal of the sleeve portion of one section at the end opposite that having the flange being notched and the similar end of the sleeve portion of the other section having lugs to fit in the notches of the first-named sleeve portion, and means for securing the flanges of the sections to each other.

In testimony whereof I affix my signature in presence of two witnesses.

HURLEY TURNBACH.

Witnesses:
 JOHN DEVANEY,
 WILLIAM BITLER.